March 11, 1952
I. C. McKECHNIE
2,588,744
AUTOMATIC ELECTRIC SPACE-DISCHARGE MATERIAL
REMOVAL METHOD AND APPARATUS
Filed Nov. 9, 1946
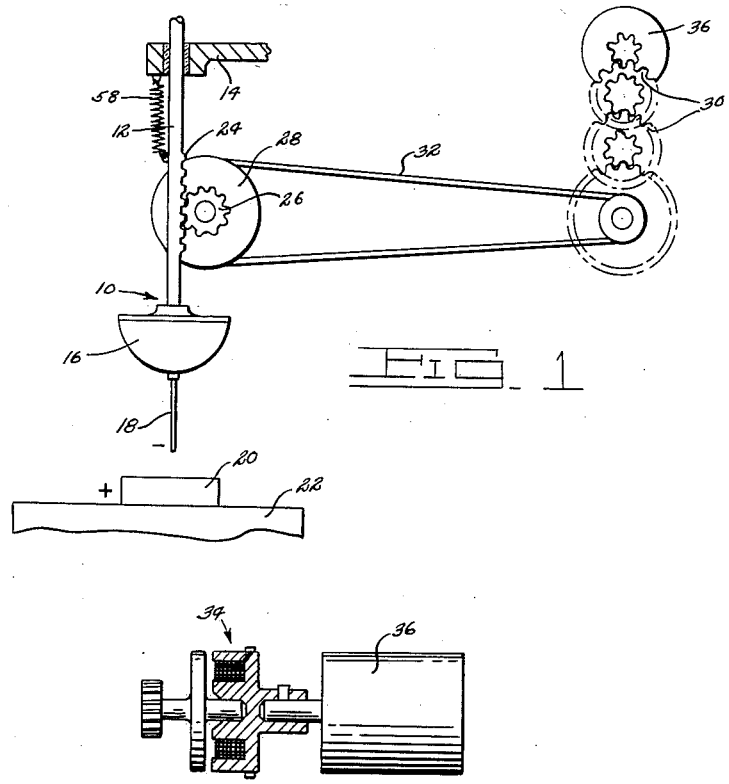
INVENTOR.
IAN C. McKECHNIE
BY
LaRue W. Vater
ATTORNEY Patented Mar. 11, 1952

2,588,744

UNITED STATES PATENT OFFICE 2,588,744

AUTOMATIC ELECTRIC SPACE-DISCHARGE MATERIAL REMOVAL METHOD AND APPARATUS

Ian C. McKechnie, Detroit, Mich., assignor to Elox Corporation of Michigan, Clawson, Mich., a corporation of Michigan Application November 9, 1946, Serial No. 709,040

4 Claims. (Cl. 219—15)

This invention relates to a method of automatically removing metallic material by an electric discharge and to apparatus therefore, the material removal features of which are more fully disclosed and described in my joint co-pending application Serial No. 602,010 for an Electric Arc Drill which issued as Patent No. 2,501,954 on March 28, 1950.

In an electric discharge drill, of the type above referred to, the drilling of an aperture in a metallic workpiece is performed by passing an electric current from a drill tip to a metallic workpiece through an electric discharge produced by maintaining a predetermined space between the tip of the drill or electrode tool and the electrode workpiece. The discharge thus produced causes disintegration of metal directly beneath the drill tip. This disintegration of metal lengthens the discharge to a point where the discharge is extinguished. It then becomes necessary to advance the drill tip toward the workpiece until the discharge is again re-established. Consequently, in electric discharge drilling, an operator is required to constantly maintain a predetermined space during the drilling operation. Heretofore, this has been done manually which requires considerable skill and loss of man hour time.

The present invention pertains to an automatic feed for the drill tip, the advancing speed of which is determined by the discharge produced between the workpiece and the drill tip.

A primary object of the invention is to maintain a predetermined average space between spaced electrodes for producing an electric discharge by controlling the movement of one of the members, toward and away from the other member, by the voltage of the discharge so produced.

Another object of the invention is to provide an electric motor drive for advancing the drill tip toward the work at a speed in proportion to the amount of metal removed by a discharge between the drill tip and the work.

A further object of the invention is to drive the electric motor by a shunt circuit across the main circuit through the drill tip and the work; to provide a rheostat for controlling the speed of the motor; and to provide a magnetic clutch between the driving connection to the drill tip and the motor.

Other objects and advantages of the invention will more fully appear from the following description taken in connection with the accompanying drawings in which:

Fig. 1 is a side elevational view showing diagrammatically an electric discharge drill and a driving connection thereto for moving the drill relative to the work;

Fig. 2 is a diagrammatic view of the magnetic clutch between the driving member and the motor, the magnetic element being shown in section; and Fig. 3 is a wiring diagram illustrating the electrical connections.

Referring to the drawings, there is illustrated an electric discharge drill 10 having a shaft 12 which is reciprocated in a support 14. A drill head 16 is supported on the lower end of the shaft 12 and carries a drill tip 18. A workpiece 20 is positioned on a support 22 beneath the drill tip 18. The shaft 12 is shown provided with rack teeth 24 which mesh with a gear 26, rotatably driven by a pulley 28. Rotation of the gear 26 in a counter-clockwise direction advances the drill bit toward the work. The pulley 28 is driven by a high ratio gear reduction train 30 through belt 32. A magnetic clutch 34 is drivingly connected to the gear train 30 and is rotated by an electric motor 36.

Referring to Fig. 3, the negative lead wire 40 of a main circuit for producing the discharge is connected to the drill head 16 and the positive lead wire 42, which is grounded, is connected to the support 22 which is electrically connected to the work 20. Connected to the main lead wire 40 is an electrical conductor 44, manually controlled switch 46, rheostat 48, electrical conductor 50 to one side of motor 36, and conductor 52 to ground.

The magnetic clutch 34 is connected to the conductor 44 through conductor 54 and to ground through conductor 56.

A tension spring 58 is connected between the support 14 and the shaft 12 for normally constituting a force for retaining the drill tip 18 spaced from the work 20. When the motor 36 and the magnetic clutch 34 are not electrically energized, the spring 58 draws the drill head 16 upwardly by slipping of the magnetic clutch. Thus a reverse drive through the gear reduction 30 is not required.

When a discharge is established between the drill tip 18 and the work 20, there is a circuit through the magnetic clutch 34 and the motor 36, the voltage therethrough being the voltage of the discharge between the drill tip and the work. The initial speed of the motor is selected by means of the rheostat 48. As the drill tip approaches the work, the voltage is reduced, reducing the motor speed and consequently the speed of travel of the tool tip. The closer the tip is to the work, the more voltage is reduced, reducing the motor speed and consequently the speed of travel of the tool tip. The closer the tip is to the work, the shorter the discharge and hence the lower the voltage. If the drill speed is too fast, the reduction of the tip voltage reduces the motor speed and hence the reduction in drill speed. This prevents over-speed and consequent welding of the tip to the work.

The energizing coil of the magnetic clutch 34 is also subjected to the same tip voltage. Should the motor fail to react quickly enough to prevent welding, the reduction in tip voltage partially or wholly de-energizes the magnetic clutch, causing the clutch to slip or disconnect the motor entirely from the drive, thus forestalling tip welding. The return spring 58 then retracts the drill tip from the work. The tip voltage then immediately rises, energizing both the motor and th clutch.

Thus it is seen that, once adjusted, the automatic feed will closely regulate the drill speed to maintain a constant space and discharge without the attention of an operator.

The speed of travel is dependent upon the kind of material forming the workpiece, the voltage carried through the main power circuit and the size of hole to be formed by the drill. This can be readily controlled by adjustment of the rheostat and the proper selection of gears in the gear reduction train 30.

It will be understood that various changes including the size, shape and arrangement of parts may be made without departing from the spirit of this invention and it is not my intention to limit its scope other than by the terms of the appended claims.

1. The method of removing material from an electrically conductive workpiece comprising connecting an electrode tool and an electrode workpiece in an electrical circuit with the tool negative and the workpiece positive, advancing the tool towards the workpiece so as to establish a predetermined space therebetween across which space an electrical material removing discharge occurs, and utilizing the space discharge voltage to advance the electrode tool toward the electrode workpiece and to maintain the predetermined space therebetween substantially constant against a force tending to retract the tool from the workpiece.

2. The method of removing material from an electrically conductive workpiece comprising connecting an electrode tool and an electrode workpiece in an electrical circuit with the tool negative and the workpiece positive, advancing the tool towards the workpiece so as to establish a predetermined space therebetween across which space an electrical material removing discharge occurs, and utilizing the space discharge voltage to advance the electrode tool toward the electrode workpiece and to maintain the predetermined space therebetween substantially constant.

3. Apparatus for removing material from an electrically conductive workpiece comprising means for connecting an electrode tool and an electrode workpiece in an electrical circuit with the tool negative and the workpiece positive, means for advancing the tool toward the workpiece so as to establish a predetermined space therebetween across which space an electrical material removing discharge occurs, and means responsive to the space discharge voltage to automatically advance the tool towards the workpiece and to maintain the predetermined space therebetween substantially constant against a force tending to retract the tool from the workpiece.

4. Apparatus for removing material from an electrically conductive workpiece comprising means for connecting an electrode tool and an electrode workpiece in an electrical circuit with the tool negative and the workpiece positive, means for advancing the tool toward the workpiece so as to establish a predetermined space therebetween across which space an electrical material removing discharge occurs, and means responsive to the space discharge voltage to displace the electrode relative to the workpiece and to maintain the predetermined space therebetween substantially constant.

IAN C. McKECHNIE.

REFERENCES CITED

The following references are of record in the file of this patent:

UNITED STATES PATENTS

| Number | Name | Date |
|---|---|---|
| 1,571,924 | Kenyon | Feb. 2, 1926 |
| 1,701,372 | Jefts | Feb. 5, 1929 |
| 1,712,114 | Kjehstad | May 7, 1929 |
| 2,024,965 | Chapman | Dec. 17, 1935 |
| 2,385,665 | Warwick | Sept. 23, 1945 |
| 2,399,212 | Dawson et al. | Apr. 30, 1946 |
| 2,427,588 | Burnett | Sept. 16, 1947 |
| 2,495,038 | Tucker | Jan. 17, 1950 |
| 2,526,423 | Rudorff | Oct. 17, 1950 |

FOREIGN PATENTS

| Number | Country | Date |
|---|---|---|
| 394,028 | Great Britain | June 22, 1933 |
| 410,494 | Great Britain | May 16, 1934 |